Dec. 14, 1943.   C. MOTT ET AL   2,336,626
TORCH CUTTING MACHINE
Filed May 28, 1941   4 Sheets-Sheet 1

INVENTORS
Chester Mott
Alfred F. Chouinard
BY
ATTORNEYS

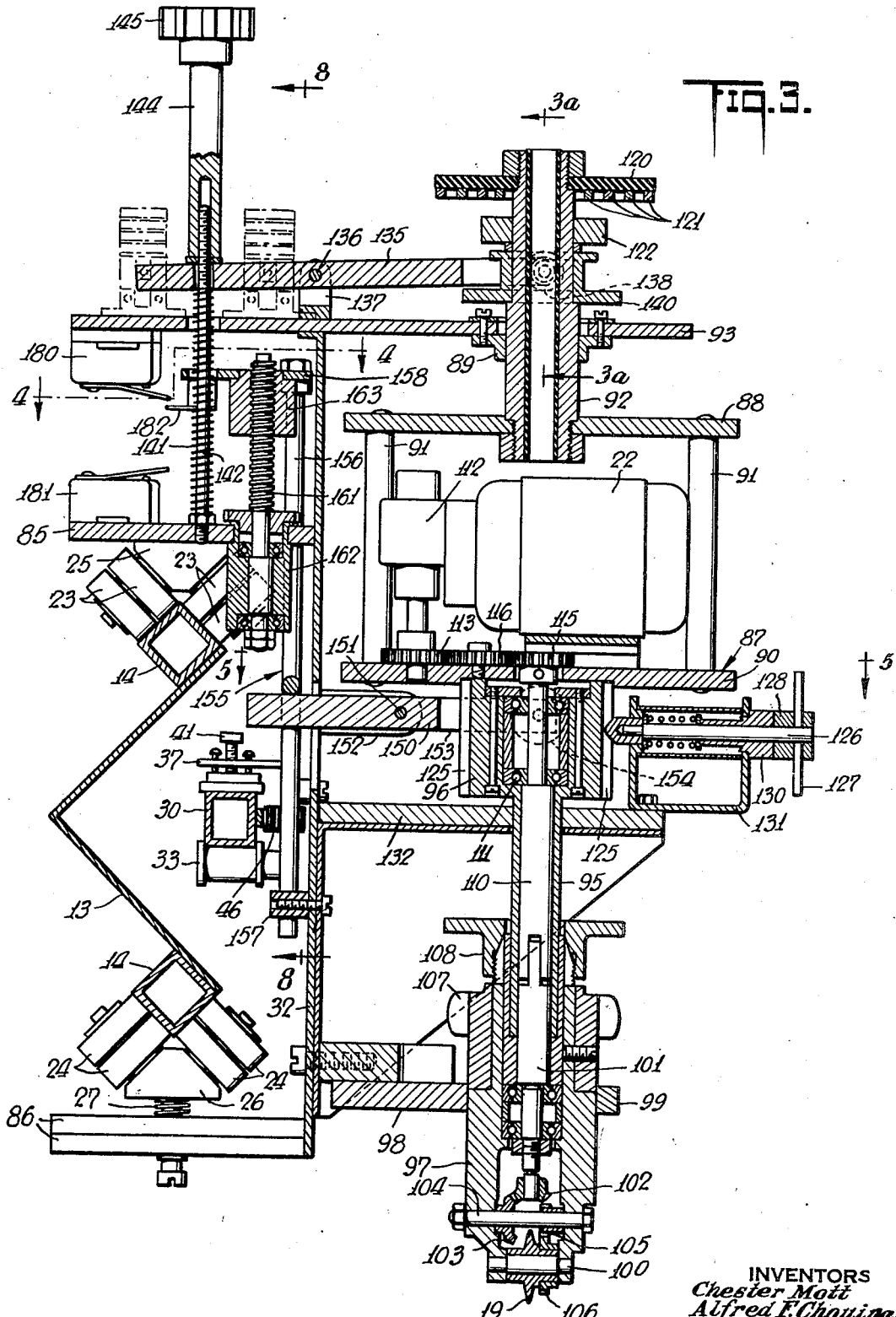

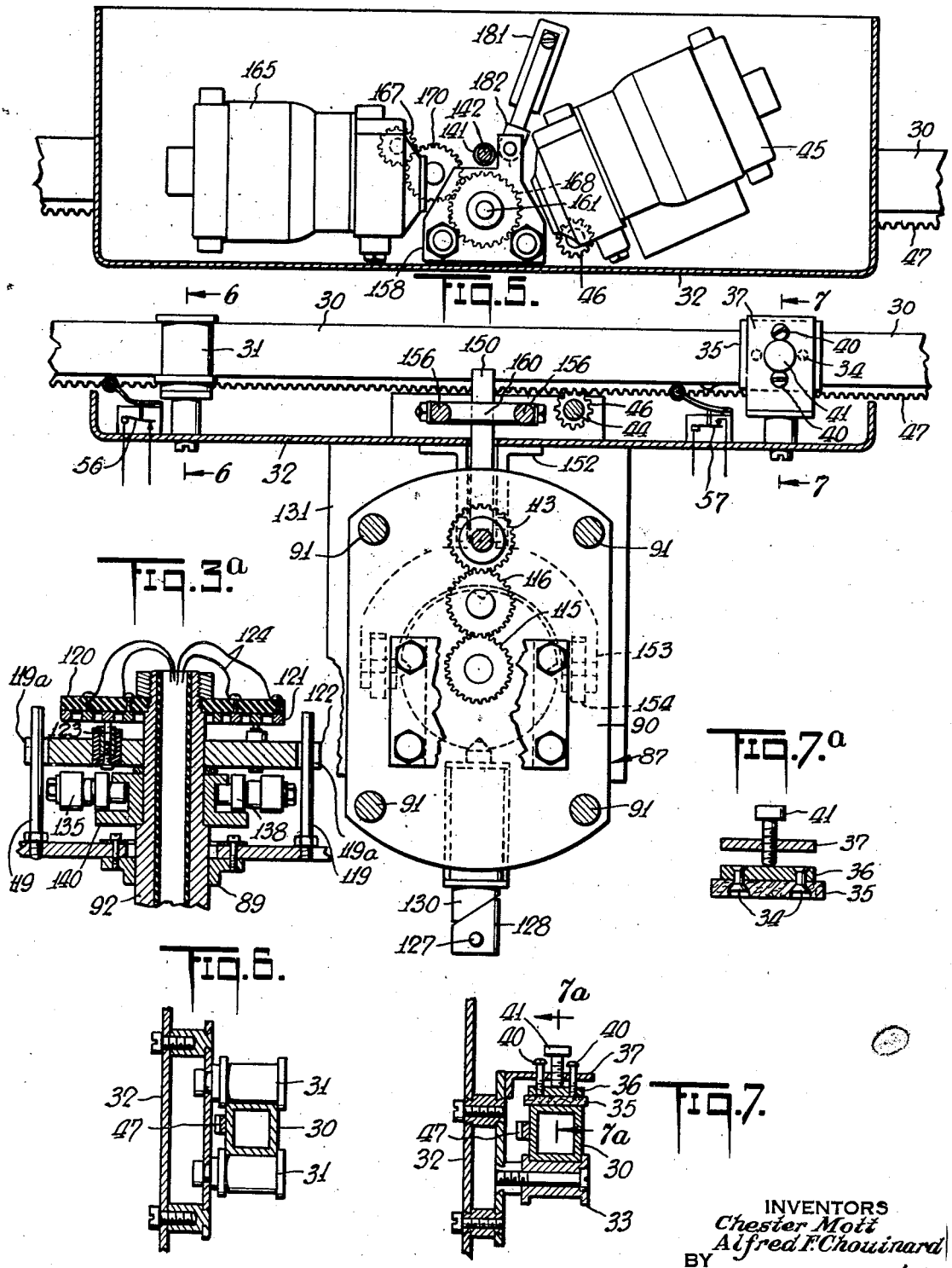

Dec. 14, 1943.  C. MOTT ET AL  2,336,626
TORCH CUTTING MACHINE
Filed May 28, 1941  4 Sheets-Sheet 4
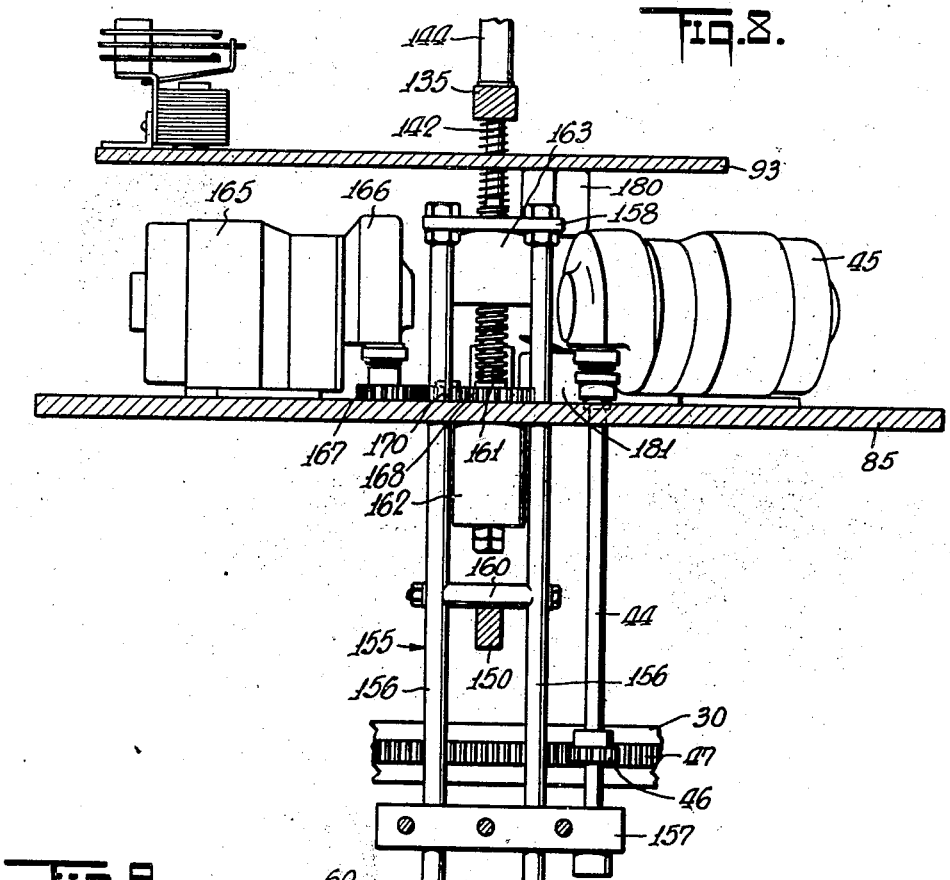
INVENTORS
Chester Mott
Alfred F. Chouinard
BY
ATTORNEYS Patented Dec. 14, 1943

2,336,626

UNITED STATES PATENT OFFICE 2,336,626

TORCH CUTTING MACHINE

Chester Mott, Evanston, and Alfred F. Chouinard, Chicago, Ill., assignors to National Cylinder Gas Company, Chicago, Ill., a corporation of Delaware Application May 28, 1941, Serial No. 395,616

22 Claims. (Cl. 266—23)

The present invention relates to that general type of torch cutting machine in which the torch is supported on a carriage, and is movable therealong and therewith in accordance with the guided movement of a driving unit. In a torch cutting machine of this general type, the drive unit is supported on the carriage for movement therealong, and includes a motor and a traction wheel driven from said motor, and adapted to be steered in accordance with the path which it is desired to have the torch follow.

One object of the present invention is to provide new and improved means by which the traction wheel of a driving unit may be raised with respect to a traction surface to permit the free movement of the driving unit or the carriage.

Another object is to provide means for effecting the raising or lowering of the traction wheel of a driving unit by remote control.

Another object is to provide means for raising or lowering a portion of the driving unit including the traction wheel and the motor which drives said wheel.

Another object is to provide motor driven means for raising the traction part of the driving unit.

Another object is to provide means for regulating the pressure of the traction wheel on a traction surface.

In a common type of torch cutting machine, the driving motor is fixed with respect to the frame structure of the driving unit, while the axis of the traction wheel is moved for steering operations. Torsional forces generated by the motor tend to deviate said traction wheel away from the steered course, so that a great deal of manual steering effort is necessary to prevent this deviation.

Another object of the present invention is to provide means whereby the deviating effect of the motor on the traction wheel is eliminated or reduced to a minimum, so that said wheel is steered with a greater accuracy and with a minimum amount of manual effort.

Another object is to provide new and improved means for connecting the driving unit to the torch or torches of the machine.

Another object is to provide new and improved means for adjusting the position of the driving unit with respect to the torch or torches of the machine.

Another object is to provide motor driven means for adjusting the position of the driving unit with respect to the torch or torches of the machine.

Another object is to provide means whereby adjustment of the driving unit with respect to the torch or torches can be effected by remote control from either one of a plurality of stations.

Various other objects, advantages and features of the invention will be apparent from the following particular description and from an inspection of the accompanying drawings, in which Fig. 1 is a perspective diagrammatic showing of a torch cutting machine incorporating the features of the present invention.

Fig. 3 is a section taken on line 3—3 of Fig. 2, but showing the tracing attachment and the drive motor therefor in a different angular position.

Fig. 3a is a section taken on line 3a—3a of Fig. 3.

Figure 1:
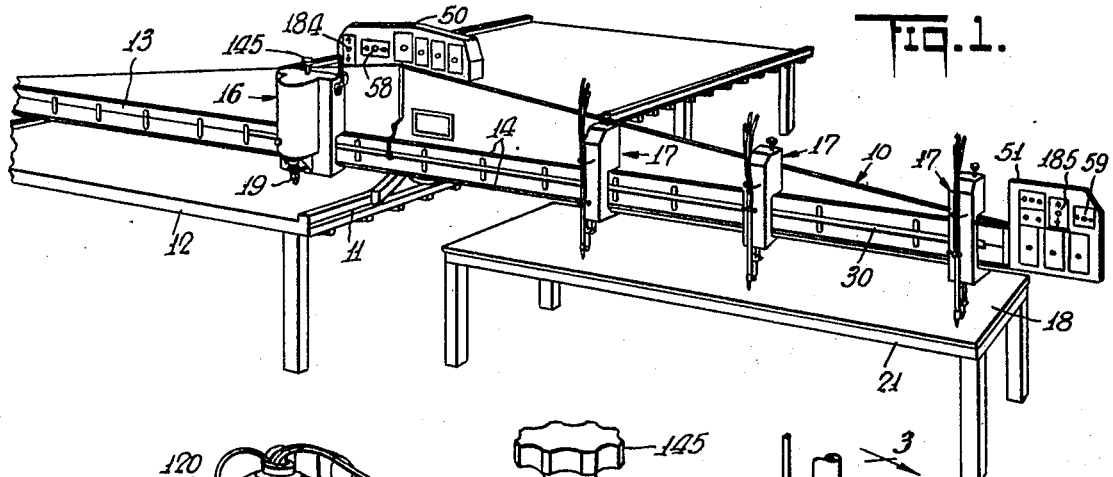

Figs. 4 and 5 are sections taken on lines 4—4 and 5—5 of Fig. 3 respectively.

Figs. 6 and 7 are sections taken on lines 6—6 and 7—7 of Fig. 5 respectively.

Fig. 7a is a section taken on line 7a—7a of Fig. 7.

Fig. 8 is a section taken on line 8—8 of Fig. 3.

Fig. 9 is a diagrammatic showing of a wiring diagram by which the position of the driving unit with respect to the torch or torches can be adjusted by remote control, and Fig. 10 is a diagrammatic showing of a wiring diagram by means of which a portion of the driving unit may be raised or lowered by remote control.

In the specific embodiment of the invention shown in the drawings, the cutting apparatus includes a carriage 10, which travels horizontally on rails 11 over a table 12, on which may be supported a templet, drawing, pattern or other guide. The carriage 10 is provided with a beam 13, having parallel superposed rails 14 secured thereto and extending at right angles to the carriage rails 11 for supporting a driving unit 16 and one or more torch crosshead units 17, and guiding them along the carriage in a horizontal direction at right angles to the direction of movement of said carriage.

The beam 13 is in the form of a plate of angular cross-section, having its V-shaped side facing the forward side of the carriage 10 to permit the driving unit 16 as well as the torch cross-head units 17 to be supported close to the vertical plane of said rails.

The crosshead units 17 may be of any suitable well known construction, or may be of the form shown and claimed in copending application Serial No. 378,102, and travel in unison over the metal to be cut to form multiple cuts from one or more metal sheets or workpieces 18 resting on a table 21 or any other suitable support.

The drive unit 16 has a traction wheel 19, driven from a motor 22, and adapted to be steered over the guide on the table 12 to cause a corresponding movement of the carriage 10 along its rails 11 and the movement of said unit along the rails 14. This drive unit 16 is provided with an upper set of guide rollers 23 and a lower set of guide rollers 24 (Fig. 3). The upper set comprises two spaced pairs of rollers, the rollers of each pair being angularly mounted for rolling contact with the V-shaped face of the upper rail 14, and supported on a bracket 25 rigid with the frame structure of the drive unit 16. The lower set of guide rollers 24 is similarly arranged in two spaced pairs, the rollers of each pair being angularly mounted for rolling contact with the V-shaped face of the lower rail 14, and mounted on a bracket 26 pressed upwardly by a spring 27 to allow for any inaccuracy in the manufacture of the rails 14.

The guided movement of the driving unit 16 is transmitted to the torch crosshead units 17 through a connecting piece 30, shown in the form of a hollow bar of rectangular cross-section, extending between and parallel to the rails 14. This bar 30 is secured to the crosshead units 17 in any suitable manner, as for instance by means of a releasable clutch, as shown and claimed in copending application Serial No. 378,102, and is supported and secured to the driving unit 16 in such a way as to permit the adjusting movement of said driving unit with respect to said bar, and with respect to said torch crosshead units. For that purpose there is provided a pair of vertically opposed flanged rollers 31 (Figs. 5 and 6), rotatably supported on the rear frame wall 32 of the driving unit, and engaging the upper and under sides of the bar 30 in rolling contact therewith. Spaced from these rollers 31 is a flanged roller 33, rotatably supported on the rear frame wall 32, and engaging the underside of the bar 30 to form a support for the latter, as shown in Fig. 7.

The means for adjustably connecting the drive unit 16 to the bar 30 comprises a friction lined clutch or brake shoe 35, seated against the top horizontal face of the bar 30, and pressed thereagainst by means of a bearing plate 36, which is securely fastened to said brake shoe by any suitable means, as for instance rivets 34. The bearing plate 36 and brake shoe 35 are supported from a frame bracket 37 by screws 40 threaded in said plate and passing loosely through holes in the bracket 37 to permit vertical movement of said bearing plate and said brake shoe. The brake shoe 35 is pressed against the bar 30 by means of a pressure screw 41 threaded in the bracket 37, and impinging on the upper surface of the bearing plate 36.

The driving unit 16 is thereby effectively secured to the bar 30 by frictional clutch pressure, which is not sufficient to prevent the adjusting movement of said drive unit along said bar. For effecting this adjustment, there is provided a vertically extending spindle 44 (Figs. 4 and 8), driven from a reversible motor 45 through a suitable reduction gearing, and carrying a pinion 46 meshing with rack teeth 47 on the front vertical face of the bar 30. By operating the motor 45, the drive unit 16 can be moved along the bar 30 against the clutch pressure of the brake shoe 35.

The operation of the motor 45 is remotely controlled from a main panel 50, fixed to the intermediate section of the carriage 10, and may also be controlled from an auxiliary panel 51 secured to one end of said carriage nearest to the torch units 17. The movement of the drive unit 16 in one direction, as for instance to the left (Fig. 1) along the bar 30, is effected through the operation of switches 52 or 53 on the panels 50 and 51 respectively, and can be effected in the opposite direction by the operation of switches 54 or 55 on said panels 50 and 51 respectively. A pair of cut-off switches 56 and 57 automatically shut off the motor 45 when the driving unit 16 is moved into either one of two limiting positions with respect to the bar 30. The switches 56 and 57 are normally closed and are provided with operating members in sliding or rolling contact with one side of the bar 30. If the bar moves to the right from the position shown in Fig. 5 until the end of the bar passes the lever of the switch 56, the latter may move out and the circuit will be broken. If the rack bar moves toward the left from the position shown in Fig. 5 until a cam on the side of the bar engages the operating lever of the switch 57, said lever will be depressed and the switch 57 will be open.

The two switches 52 and 54 on the main panel 50 are desirably controlled by a single lever 58 disposed between the two switch blades, and extending horizontally. This lever 58 is spring-pressed, and when angularly moved to the left, will reverse the switch 52 into dotted position shown and thereby cause racking of the drive unit 16 to the left. When the lever 58 is released, the switch 52 is returned to neutral position to stop motor 45 and thereby stop further racking of the drive unit. When the lever 58 is angularly moved to the right, the switch 54 will be reversed into the dotted position shown and the drive unit 16 racked towards the right.

A spring-pressed lever 59 operates between the two switches 53 and 55 on the auxiliary panel 51 in a manner already described with reference to lever 58.

Fig. 9 shows a desirable electrical system by which the motor 45 can be controlled from a plurality of remote control stations.

In the operation of this system, if, for instance, it is desired to move the drive unit 16 to the left (Fig. 1) along the bar 30 from the main panel 50, the switch 52 is moved into the dotted line position shown, so that the current will flow from the main A, through the switch 52 in dotted position to point 60, through the limit switch 56 to point 61, through the motor field 62 of the motor 45, through a relay contact 63 to point 64, through the armature 65 of the motor 45 to point 66, through relay contact 67 to point 79, and then out through the main B. The operation of the cut-off limit switch 56 controlled by the movement of the driving unit 16 beyond a predetermined point, opens the circuit described, and shuts down the motor 45.

If the switch 53 on the auxiliary panel is actuated into the dotted position shown, current flows from the main A, through the switch 52 in full line position, through the switch 54 in full line position, through the switch 53 in dotted line position, to point 60, and from there flows through the field winding 62, and through the motor armature 65 in the same direction previously described, so that the motor 45 rotates to move the driving unit 16 to the left (Fig. 1).

By operation of the switch 54 on the main panel 50 into the dotted position shown, the driving unit 16 will be moved towards the right (Fig. 1). In this dotted position of the switch 54, the current flows from the main A, through the switch 52 in full line position, through the switch 54 in dotted position to point 72, through the switch 57 in full line position, through the relay coil 73 to point 70, and then out through the main B. When this relay coil 73 is energized, contacts 63 and 67 are opened, and contacts 74, 75 and 76 are closed as indicated by the dotted lines. When these three contacts 74, 75 and 76 are closed, current also flows from main A to point 77, through the contact 74 in dotted position to point 61, through the motor field winding 62, through contact 75 in dotted position to point 66, through the armature winding 65 in the direction opposite to that indicated for the operation of the switches 52 and 53, to point 64, through contact 76 in dotted position to point 70, and out through the main B. This will cause rotation of the motor 45 in the reverse direction so that the driving unit is moved towards the right (Fig. 1).

By operation of the switch 55 on the auxiliary panel 51 to the right and in the dotted position shown, the driving unit 16 will be moved towards the right (Fig. 1). In this dotted position of the switch 55, the current flows from main A, in succession through switches 52, 54 and 53 in full line positions, through switch 55 in dotted position and to point 72. From point 72 the current flows through relay coil 73, and thus through the motor armature winding 65 in the same direction previously described, with reference to the operation of the switch 54, so that the motor 45 rotates in a direction to move the driving unit 16 to the right (Fig. 1).

It should be noted that the switches 52, 54, 53 and 55 dominate each other in predetermined sequences, so that simultaneous operation of the switches on the two panels 50 and 51 will effect racking movement of the drive unit 16 only in accordance with the operation of the switches from the main panel 50. In the specific form shown, switch 52 electrically dominates the other switches 54, 53 and 55, since the availability of current to said switches 54, 53 and 55 is totally dependent upon switch 52 remaining in normal full line position shown. In a similar manner switch 54 electrically dominates switches 53 and 55.

If switch 52 is actuated into the dotted line position shown, then no current is available at the other three switches 54, 53 and 55, and if switch 54 is actuated into the dotted line position shown, no current is available to the switches 53 and 55. This feature of construction assures safety in operation. If two operators should, for instance, actuate the switches 52 and 55 simultaneously into the dotted positions shown, the actuation of the switch 55 will have no effect, since the racking of the drive unit 16 will be controlled by the actuation of the dominating switch 52 on the main panel 50, and the drive unit 16 will move towards the left (Fig. 1). Similarly simultaneous operation of the switches 54 and 53 into dotted positions shown will cause movement of the drive unit 16 towards the right (Fig. 1) in accordance with the operation of the dominating switch 54 on the main panel 50.

As far as certain aspects of the invention are concerned, the means for racking the drive unit 16 with respect to the torch units 17 need not be motor driven, but can be effected manually through a handle on the spindle 44. If the clutch pressure of the brake shoe 35 on the rack bar 30 is too great to be overcome by manual turning of the spindle 44, means may be provided for relieving this pressure. For instance, a cam may be provided, which is turned through operation of a handle such as a crank, and which serves to lift the brake shoe 35 from the rack bar 30 so that racking of the drive unit 16 may be manually effected as described.

The frame structure of the driving unit 16 comprises the rear frame wall 32, disposed closely adjacent to the beam 13, and a pair of horizontal plates 85 and 86 (Fig. 3), secured to and extending rearwardly of said wall, and disposed above and below said beam respectively to form supports for the roller brackets 25 and 26. Pivotally mounted on the frame structure of the driving unit 16 is a turret motor head 87, having an upper horizontal plate 88 and a lower horizontal plate 90 supporting the driving motor 22, the two plates being interconnected by means of rods 91. Secured to and extending upwardly from the upper turret plate 88 is a pivot shaft 92, journalled in a bearing 89, which is fixed to a horizontal bearing plate 93, secured to and extending forwardly and rearwardly of the frame plate 32.

A tracing attachment is secured to a sleeve 95, which is fixed to a chuck 96 rigid with the turret plate 90, and which extends vertically in axial alignment with said chuck and the pivot shaft 92. This tracing attachment includes a tracing head 97, slidably and rotatably mounted in a bearing plate 98, 99 rigid with the rear frame wall 32. The lower end of this tracing head 97 carries a horizontal shaft 100 to which is affixed the traction wheel 19. A drive spindle 101 is supported in suitable bearings in the tracing head 97, and drives the traction wheel 19 through a transmission, which includes a bevel gear 102 affixed to the lower end of said spindle, and meshing with a bevel gear 103, secured to a horizontal shaft 104, journalled in the tracing head 97. A pinion 105 secured to this shaft 104 meshes with a pinion 106 affixed to the hub of the tracing wheel 19.

A steering wheel 107 has a hub embracing and secured to a reduced section of the bracing head 97, the upper part of said section extending upwardly beyond said steering wheel and being threaded to receive a locking nut 108. This upper tracing head section is longitudinally split for clamping attachment to the lower end of the turret sleeve 95 upon the turning of the locking nut 108.

A drive shaft 110 is journalled in suitable bearings 111 in the chuck 96 and extends through the turret sleeve 95. This drive shaft 110 is driven from the motor 22 through a suitable transmission, consisting of a reduction gearing 112, a gear 113 on the outlet shaft of said reduction gearing, a gear 115 on the upper end of said drive shaft 110 and an idler gear 116 between said gears 113 and 115 rotatably supported on the lower turret plate 90. The lower end of this drive shaft 110 has a slot and tongue connection with the upper end of the drive spindle 101.

The tracing attachment forms a detachable unit, which can be axially slipped off and removed from the turret sleeve 95 after removal of screws 109, and semi-circular bearing plate 99, and after loosening of the lock nut 108. The slot and tongue connection between the shafts 101 and 110 permits drive connection or disconnection between said shafts upon simple axial movement of the tracing attachment.

Figure 2:
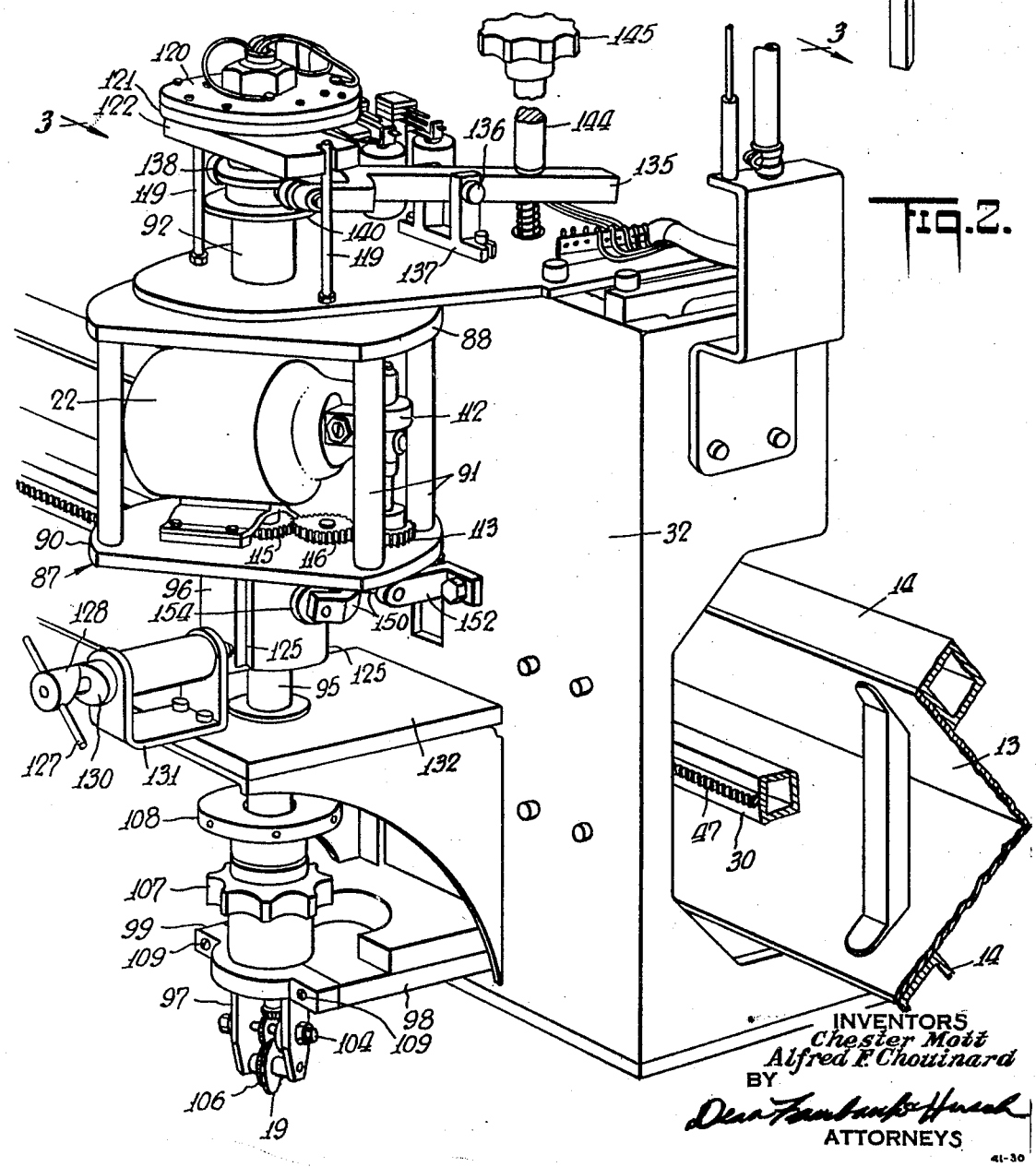
Fig. 2 is a fragmentary perspective of the driving unit of the machine, shown with the outer casing removed, and in raised position.

Rotation of the steering wheel 107 causes rotation of the tracing attachment and corresponding rotation of the turret head 87 and drive motor 22. To maintain proper electrical connections to the motor 22 during this rotation, there is provided a commutator on the upper end of the pivot shaft 92 (Figs. 2 and 3a), which includes a disc 120, affixed to said shaft and having on the underside thereof four concentric conductor rings 121. A support plate 122 loosely embraces the pivot shaft 92 below the commutator rings 121, and is held against rotation by a pair of upright rods 119, fixed to the frame plate 93, and extending through respective slots 119a in said support plate. This support plate 122 carries four carbon brushes 123, spring-pressed into electrical contact with the rings 121 respectively. Four leads 124 from the terminals of these four rings 121 extend through the pivot shaft 92 and connect to the terminals of the armature and the field of the motor 22. In this manner electrical connection to the motor 22 is maintained while said motor is bodily rotated during tracing movement of the traction wheel 19.

In the operation of the driving unit 16 so far described, the wheel 107 is steered by hand to maintain the traction wheel 19 along the path of the guide on the table 12. Since the drive motor 22 is supported on the turret head 87, the steering rotation of the traction wheel 19 causes a corresponding rotation of said motor. This arrangement eliminates the torsional effect of the usual drive motor fixed against rotation, and thereby eliminates any tendency of the driving unit to deviate from the steered course, and permits the driving unit after being set on any straight line course to travel along said course without guiding efforts.

To hold the turret head 87 against rotation, as for instance when it is desired to have the traction wheel 19 follow a predetermined straight path without hand steering, the turret chuck 96 has a series of grooves 125 (Figs. 2 and 3), extending lengthwise thereof and circumferentially positioned with respect to the vertical plane of the traction wheel in accordance with the desired direction of straight movement of said wheel. A plunger 126 is spring-pressed into any one of the chuck grooves 125, and is provided at its outer end with a turning handle 127 and a cam 128 engaging a cam 130 fixed to a bracket 131, which is secured to a bearing plate 132. These cams 128 and 130 serve to withdraw the plunger 126 from the chuck groove 125 against spring action upon rotation of the handle 127, and to hold said plunger in this position. When the plunger 126 is in this withdrawn position, the turret head 87 is free to rotate about its pivot axis and the traction wheel 19 correspondingly free to be hand steered along the guide. When the plunger 126 is rotated to permit its extension into one of the chuck grooves 125, the turret head 87 is held against rotation, and the traction wheel 19 is also held against body rotation, and will therefore follow a straight course.

The turret head 87 with the drive motor 22 and attached tracing device are vertically slidable as a unit in the bearing plates 93 and 98. This unit is spring-pressed downwardly by means of a lever 135, pivotally supported at 136 on a bracket 137 fixed to the plate 93. The forward end of this lever 135 is in the form of a yoke which straddles the turret pivot shaft 92, and which carries rollers 138 engaging a collar 140 fixed to said shaft. A spring 141 bearing against the underside of the rear end of the lever 135 is seated on the frame plate 85, and extends vertically around a rod 142 having its lower end secured to said plate. This rod 142 passes through an opening in the plate 93 and loosely through the lever 135, and has threaded at its upper end a pressure regulating nut 144 bearing against said lever and provided with a suitable handle 145. The spring 141 presses the turret head 87 downwardly, so that the traction wheel 19 has a spring-pressed traction engagement with the guide surface on the table 12. By means of the regulating nut 144, the traction pressure of the wheel 19 on this guide surface can be adjusted.

For lifting the turret head 87 with attached tracing unit from the guide surface against the action of the spring 141, there is provided underneath the turret plate 90 a lever 150, pivotally secured at 151 to a bracket 152 rigid with the rear frame wall 32, and formed at its forward end with a yoke 153 straddling the chuck 96. The forward ends of the arms of this yoke 153 carry rollers 154 respectively, adapted to engage the lower face of the turret plate 90. The rear part of the lever 150 extends through an opening in the rear frame wall 32, and is engaged by a slide 155 on the rear side of said wall to effect counter-clockwise tilting of said lever (Fig. 3) about its pivot 151 upon downward movement of said slide.

The slide 155 desirably comprises a pair of vertical parallel guide rods 156, which are slidable in the frame plate 85 and a bearing block 157 rigid with the rear frame wall 32, and which are interconnected at their upper ends by a plate 158. A rod 160 extending crosswise between the guide rods 156 engages the upper side of the lever 150 to tilt said lever upon downward movement of the slide 155. To effect this downward movement of the slide 155, there is provided a lead screw 161, which is journalled in bearings in a bushing 162 fixed to the underside of the frame plate 85, and which is threaded in a nut 163 fixed to the plate 158. A motor 165 supported on and fixed to the frame plate 85 drives the lead screw 161 through a transmission consisting of a reduction gearing 166, a gear 167 on the output shaft of said reduction gearing, a gear 168 fixed to said lead screw, and an idler gear 170 between said gears 167 and 168. Rotation of this motor 165 causes downward movement of the slide 155 and lifting of the turret head 87 and tracing attachment as a unit.

The operation of the motor 165 is remotely controlled from the main panel 50, and may also be controlled from the auxiliary panel 51. The upward movement of the turret head of the drive unit 16 is effected through operation of a switches 175 and 176 on the panels 50 and 51 respectively, while the downward movement is effected by operation of switches 177 and 178 on said panels 50 and 51 respectively. A pair of cut-off or limit switches 180 and 181 automatically shut off the motor 165 when the slide 155 is moved into either one of two vertical limiting positions. These cut-off switches 180 and 181 are desirably secured to the frame plates 93 and 85 respectively, and are opened by a finger 182 rigid with the nut plate 158.

The two switches 175 and 177 on the main panel 50 are desirably controlled by a single lever 184, disposed between the two switch blades and extending horizontally. This lever 184 is spring-pressed, and when angularly moved upwardly, will reverse the switch 175 into dotted position shown, and thereby cause upward movement of the entire turret head assembly and tracing unit. When the lever 184 is released, the switch 175 is returned to neutral position to stop the motor 165, and thereby stop further upward movement of the turret head assembly and tracing unit. When the lever 184 is angularly moved downwardly, the switch 177 will be reversed into the dotted position shown, and the turret head assembly and tracing unit moved downwardly.

A spring-pressed lever 185 operates between the two switches 176 and 178 on the auxiliary panel 51 in the manner already described with reference to the lever 184.

Fig. 10 shows a desirable electrical system by which the motor 165 can be controlled from a plurality of remote control stations. This circuit is similar to that shown in Fig. 9 and described with reference to the racking of the drive unit along the bar 30, the various switches and relays being connected and operated in a similar manner with similar sequence control.

After the turret head assembly and tracing unit have been raised to the desired position, or to limiting position as determined by the operation of the cut-off or limit switch 181, the turret head assembly and tracing unit can only be restored into operative downward position by reversal of the levers 184 or 185 downwardly to cause an upward movement of the slide 155. This upward movement of the slide 155 releases the lifting lever 150, so that the entire turret head assembly and tracing unit are free to move downwardly by the action of gravity, and also by the action of the spring-pressed lever 135.

As far as certain aspects of the invention are concerned, the means for lifting the turret head assembly and tracing unit need not be motor driven, but can be effected manually through the operation of a cam engaging the lever 150, and rotatable by means of a suitable handle, such as a crank. With this construction, when the crank handle is rotated in one direction, the cam engaging the underside of the lever 150 angularly rotates said lever to effect lifting of the entire turret head assembly and tracing unit. When the crank is turned in an opposite direction, the corresponding rotation of the cam releases the lever 150, and thereby permits the entire turret head assembly and tracing unit to be lowered into operative position.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

What is claimed is:

1. In a cutting machine, the combination comprising a carriage supported on rails, a cutting torch supported on said carriage, a unit also supported on said carriage for driving said carriage along said rails and said torch along said carriage, a bar slidable endwise on said carriage and connecting said cutting torch and said unit, and means including a reversible motor on said unit for adjusting the position of said unit along said bar, the direction of adjusting movement of said unit along said bar depending on the direction of movement of said motor.

2. In a cutting machine, the combination comprising a carriage, a tracing device and a cutting torch independently supported on said carriage and movable along the latter, means connecting said torch and said tracing device and holding them against relative movement, a motor for adjusting the relative spacing of said device and said torch, a pair of switch means for controlling the operation of said motor, and means whereby simultaneous operation of the two switch means will effect operation of said motor only in accordance with the operation of a predetermined one of said switch means, while the other switch means remains ineffective.

3. In a torch cutting machine, the combination comprising a carriage, a tracing device supported on said carriage, and including a traction wheel, a motor forming a unit with said tracing device, means operable upon rotation of said motor for raising said traction wheel, manually controlled switch means for shutting off said motor when said traction wheel has been elevated to a selected position, and limit switch means for automatically shutting off said motor when said wheel is elevated to a predetermined elevated position.

4. In a torch cutting machine, the combination comprising a carriage, a vertically slidable tracing and driving unit supported on said carriage for movement therewith and therealong, and including a traction wheel, and a motor for driving said wheel, a slide, a lead screw for moving said slide, means actuated by the movement of said slide in one direction for raising said unit into inoperative position, a reversible motor for rotating said lead screw, and limit switch means for shutting off current to said second-mentioned motor when said slide reaches either one of its limiting positions.

5. In a torch cutting machine, the combination comprising a carriage, a tracing unit supported on said carriage, means for lifting said unit, and including a motor, and a pair of switch means for controlling the operation of said motor, and means whereby simultaneous operation of the two switch means will effect operation of said motor only in accordance with the operation of a predetermined one of said switch means, while the other switch means remains ineffective.

6. In a cutting machine, the combination comprising a carriage, a tracing device and a cutting torch independently mounted on said carriage, a bar slidable endwise on said carriage and connecting said tracing device and said torch, said tracing device including a traction wheel, three motors forming a movable unit with said device, means for driving said wheel from one of said motors, means for lifting said device into inoperative position by operation of the second of said motors, and means for adjustably moving said tracing device along said bar by operation of the third motor.

7. In a torch cutting machine, the combination comprising a carriage, a tracing device supported on said carriage, and including a traction wheel, and means movable along said carriage with said tracing device for lifting said traction wheel selectively into any one of an infinite number of positions, and for locking said wheel in selected position against downward movement.

8. In a torch cutting machine, the combination comprising a carriage, a tracing device supported on said carriage, and including a traction wheel, motor driven means for lifting said traction wheel, and hand-operable means for lifting said traction wheel.

9. In a cutting machine, the combination comprising a carriage having a pair of vertically spaced horizontal rails, a tracing device and a cutting torch independently mounted on said rails and movable along the latter in a direction at right angles to the direction of movement of the carriage, a rack bar between said rails and slidable lengthwise thereof and connected to said torch and said tracing device, and means for adjusting said tracing device along the length of said bar and toward and from said torch.

10. A cutting machine having a pair of rails disposed in substantially the same horizontal plane, a carriage movable along said rails and having a pair of horizontal rails vertically spaced in substantially the same vertical plane and which is at right angles to the plane of said first mentioned rails, a bar extending lengthwise and between said second mentioned rails, a torch and a tracing unit supported by and movable along said second mentioned rails and connected to said bar, and means for adjusting said tracing device along said bar.

11. A cutting machine having a pair of rails disposed in substantially the same horizontal plane, a carriage movable along said rails and having a pair of horizontal rails vertically spaced in substantially the same vertical plane and which is at right angles to the plane of said first mentioned rails, a rack bar extending lengthwise and between said second mentioned rails, a torch and a tracing unit supported by and movable along said second mentioned rails, means for connecting said torch to said rack bar, a pinion connected to said tracing unit and engaging said rack bar, and friction means also carried by said tracing unit and engaging said rack bar whereby said tracing unit may be adjusted along said bar by rotation of said pinion and against the action of said friction means.

12. A cutting machine including a carriage supported on rails and having a pair of vertically spaced horizontal rails extending in a direction at right angles to the direction of movement of said carriage, a cutting torch mounted on said last mentioned rails, a unit also mounted on said last mentioned rails for driving said carriage along its rails and said torch support along said second mentioned rails, a rack bar connected to said torch support and movable endwise in a direction parallel to and between said second mentioned rails, a friction clutch member carried by said driving unit and engaging said bar to effect movement of said bar with said driving unit, and a pinion carried by said unit and meshing with said rack bar for adjustably moving said unit in respect to said bar.

13. A cutting machine including a carriage, a tracing device, and a cutting torch independently supported on said carriage and movable along the latter, a rack bar connected to said torch and slidable endwise on said carriage in a direction at right angles to the direction of movement of the latter, and means normally preventing relative movement of said tracing device and said bar, said tracing device having a pair of motors, one for moving said tracing device and said bar and the other for moving said tracing device in respect to said bar.

14. A cutting machine including a carriage, a tracing device, and a cutting torch independently mounted on said carriage and movable along the latter, a bar connected to said torch and slidable endwise on said carriage in a direction at right angles to the movement of the latter, frictional means normally preventing relative movement of said tracing device along said bar, and a motor associated with said tracing device for adjusting the position of said device along said bar and against the action of said frictional means.

15. A torch cutting machine including a carriage, a tracing unit supported on said carriage and movable therealong, a motor operated lever for raising and lowering said unit, and a separate spring pressed lever for pressing said unit downwardly, independent of the action of the first mentioned lever.

16. A torch cutting machine including a carriage, a tracing unit supported on said carriage and movable therealong, and having a traction wheel and a pair of electric motors carried by and movable with said tracing unit, one of said motors being operatively connected to said traction wheel for driving the latter, and the other operable to raise and lower the tracing unit in respect to the carriage.

17. A torch cutting machine having a carriage, a torch support and a tracing unit mounted thereon and movable therealong, said tracing unit having a traction wheel, means for spacing and normally rigidly connecting said torch support and said tracing unit, and a pair of electric motors carried by and movable with said tracing unit, one of said motors being operatively connected to and serving to drive said traction wheel, and the other of said motors operable to adjust said tracing unit toward and from said torch support and along said carriage.

18. A torch cutting machine including a carriage, a tracing unit supported on said carriage and movable therealong, means on said unit for raising and lowering said unit, a spring pressed lever for pressing said unit downwardly, independent of the action of said means, and adjustable means for limiting said downward movement.

19. A torch cutting machine including a carriage, a tracing unit supported on said carriage and movable therealong, means on said unit for raising and lowering said unit, a spring pressed lever for pressing said unit downwardly, independent of the action of said means, and adjustable means engaging said lever for limiting said downward movement.

20. A torch cutting machine having a carriage supported on rails, a cutting torch supported on said carriage, a unit also supported on said carriage for driving said carriage along said rails and said torch along said carriage, a bar slidable endwise along said carriage and connecting said cutting torch and said unit, a reversible motor on said unit for adjusting the position of said unit along said bar, and limit switches for breaking the circuit of said motor when said unit is in either of two opposite predetermined positions in respect to said bar.

21. A torch cutting machine including a carriage, a tracing unit supported on said carriage and movable therealong, a cutting torch also carried by said carriage and movable therealong, means connecting said tracing unit and said torch and normally holding them in predetermined spaced relationship, a pair of rotatable members on said tracing unit, means for rotating one of said members to raise or lower the tracing unit, and means for rotating the other of said members to change the relative spacing of the tracing unit and the cutting torch.

22. A torch cutting machine including a carriage having a rack bar extending lengthwise thereof and movable endwise thereon, a cutting torch on said carriage and connected to said rack bar, a tracing unit on said carriage, a pinion on said tracing unit and engaging said rack bar, and means for rotating said pinion to change the spacing between said tracing unit and said cutting torch.

CHESTER MOTT.
ALFRED F. CHOUINARD.